United States Patent [19]
Onishi et al.

[11] 3,870,620
[45] Mar. 11, 1975

[54] PHOTOPOLYMERIZATION PROCESS FOR THE MANUFACTURE OF COPOLYMER OF BUTADIENE AND ACRYLONITRILE

[75] Inventors: Akira Onishi; Toshio Yukuta, both of Tokyo; Yutaka Iseda, Kyoto; Kouichi Iwami, Tokyo, all of Japan

[73] Assignee: Bridgestone Tire Company Limited, Tokyo, Japan

[22] Filed: Jan. 21, 1971

[21] Appl. No.: 108,563

[30] Foreign Application Priority Data
Jan. 23, 1970  Japan.................................. 45-5674

[52] U.S. Cl....... 204/159.23, 204/159.24, 260/82.3, 260/83.1
[51] Int. Cl............................ C08d 1/00, C08f 1/16
[58] Field of Search................. 204/159.22, 159.23; 260/89.7 R, 82.3

[56] References Cited
UNITED STATES PATENTS
2,326,736   8/1943   Adelson et al................. 204/159.23

FOREIGN PATENTS OR APPLICATIONS
1,123,724   4/1968   Great Britain
2,020,772   11/1970   Germany

OTHER PUBLICATIONS

Furukawa et al., Novel Synthetic Rubber by Alternating Copolymerization, English Translation of Symposium of Japanese Chemical Fiber Institute, October 1968.

*Primary Examiner*—Paul Lieberman
*Assistant Examiner*—Richard B. Turer

[57] ABSTRACT

An alternating copolymer of butadiene and acrylonitrile is effectively manufactured without using expensive catalysts which are often dangerous and difficult to be completely removed so as to deteriorate the resulting copolymers by photopolymerization in the presence of a particular sensitizer system which is selected from a group consisting of some benzenic aromatic hydrocarbons and halides thereof, some polynuclear aromatic hydrocarbons and halides thereof, some heterocyclic compounds, and aromatic- or aliphatic-azoic and aminic hydrocarbon compounds, and some ketonic, glyoxalic and aldehydic compounds, in the amount of $1/10^{10}$ to 1/4 mole per 1 mole of the total monomers as charged, with radiating light of the wave length ranging from 2,000 to 6,000 Angstrom.

7 Claims, No Drawings

PHOTOPOLYMERIZATION PROCESS FOR THE MANUFACTURE OF COPOLYMER OF BUTADIENE AND ACRYLONITRILE

This invention relates to a novel process for manufacturing an alternating copolymer of butadiene and acrylonitrile with use of photopolymerization.

Recently interest has been aroused in such copolymers of the alternating structure as might be regarded as extremity of developing random structure copolymers into those of regular structure, also in respect of elastomers or as elastomers. As alternating copolymers, the combination of styrene with maleic anhydride was known (Ber., 63B, 3213, (1930)). It was also known to react acrylonitrile with zinc chloride and ethylaluminum dichloride to form the complex compound, which is subjected to radical-polymerization so as to obtain an acrylonitrile-styrene alternating copolymer ("Kobunshi" or Highpolymers, 16, 1172 (1967)). It has also been reported to synthesize alternating copolymers though of lower molecular weight of ethylene with butadiene (Makromol. Chem., 79, 161 (1964)), and of acrylonitrile with propylene (Polymer Letters, 5,47 (1967)).

It has recently been disclosed that an alternating copolymer of butadiene with acrylonitrile whose physical properties are very interesting as a synthetic rubber can be manufactured by means of a thermal polymerization method using a catalyst system comprising an organic aluminum halide and a transition metal compound in combination (U.S. pat. application Ser. No. 740,342 of June 26, 1968), whose high regularity of alternation has been demonstrated by infrared absorption spectrum, nuclear magnetic resonance absorption spectrum, elemental analysis and other results, together with some of the physical properties thereof (The 17th "Highpolymers" Annual Assembly in Tokyo, 1968). According to the report, the resulting product is an alternating structure copolymer of stereo-uniformity wherein every butadiene unit is connected with trans- 1,4 bonding, and as for physical properties of the vulcanized copolymer, despite the lower hardness and modulus thereof than those of the conventional super-high nitrile NBR, breaking strenght, elongation as well as rebound elasticity are considerably higher. Compared with the conventional superhigh nitrile NBR, said elastomer is substantially the same in oil resistant swelling degree but superior in oil resistant strength and strength at higher temperatures. It is very interesting that said copolymer is, when stretched, orientation-crystallized the same as in the natural rubber which has been confirmed by means of the X-ray method, and can be reinforced with carbon even when not vulcanized. In view of the foregoing, various new uses of said alternating structure NBR have been expected as synthetic rubber not only having a relatively high flexibility, considerably high strength and desirable dynamic properties but also being of high oil resistance.

The inventors have already proposed a series of processes for manufacturing dual and plural alternating copolymers in which the mole ratio of the total of electron donor monomers such as conjugated dienes, terminally unsaturated olefinic compounds and vinyl substituted aromatic hydrocarbons to the total of electron acceptor monomers such as acrylonitrile, methacrylonitrile and $\alpha, \beta$-unsaturated carboxylic esters is always 1 to 1 and every unit of said donor and acceptor monomers is alternately combined, by proceeding with the reaction with photoradiation, with photoradiation in the presence of at least one aluminum halide as catalyst (U.S. patent application Ser. NO. 884,249 of Dec. 11, 1969) and with photoradiation in the presence of at least one metal halide compound and at least one organic metal halide compound as catalyst and in addition thereto a photosensitizer and gel-preventing agent.

The inventors have further developed the study on these polymerization reactant systems to find out that proceeding with the photopolymerization reaction in the presence of a particular photosensitizer system can considerably improve the yield of the objective alternating copolymer, on which finding this invention is based. The novel and essential feature of the invention lies in adding only such sensitizer system to the reactants consisting of an electron donor monomer or butadiene and an electron acceptor monomer or acrylonitrile for proceeding with the photopolymerization to obtain the corresponding alternating copolymer in which each of said two sorts of monomer units is alternately combined so that the mole ratio of said monomers is always 1 to 1, in which the butadiene unit is combined with trans 1,4 bonding. This unexpected result could not be anticipated from the known art in this technical field.

It was well known that simple addition of butadiene to acrylonitrile at room temperature would not cause the reaction therebetween but when heating at a higher temperature the so-called Diels-Alder reaction takes place to produce the codimer. However, it would be an unexpected fact that the photopolymerization of said reactants in the presence of the particular photosensitizer can be carried out at room temperature to effectively produce the copolymer of a higher polymerization degree in higher yield.

The invention has various advantages, among which there are pointed out;

1. that it is satisfactory from an economic view point owing to the fact that there is no necessity to use expensive catalysts or other additives,
2. that it is free by dangers caused from using some catalysts, and
3. that there is no fear that the catalyst residue will cause deterioration of the resulting copolymer.

It can be appreciated that the invention provides a new photopolymerization method in this field with high effectiveness and economy to attain a high regulation of alternation.

The process according to the invention is characterized by photopolymerization of butadiene and acrylonitrile in the presence of a photosensitizer system comprising at least one selected from a group consisting of (1) benzenic aromatic hydrocarbons having benzene as a nucleus and a hydrocarbon radical of 1 to 10 carbon atoms, and halides thereof, (2) polynuclear aromatic hydrocarbons having naphthalene, phenanthrene, anthracene, fluorene, anthraquinone, or xanthone as a basic nucleus and a hydrocarbon radical of 1 to 10 hydrogen or carbon atoms, and halides thereof, (3) heterocyclic compounds having pyridine, quinoline, isoquinoline or carbazole as a basic nucleus and a hydrocarbon radical of 1 to 10 hydrogen or carbon atoms, and aromatic- or aliphatic-azoic and aminic hydrocarbon compounds and (4) ketonic, glyoxalic and aldehydic compounds of the general formulae,

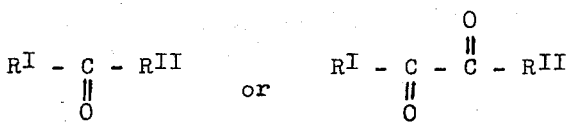

wherein $R^I$ represents a hydrocarbon radical having 1 to 10 hydrogen or carbon atoms and $R^{II}$ represents a hydrocarbon radical having 1 to 10 carbon atoms, and

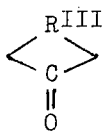

wherein $R^{III}$ represents a hydrocarbon radical having 1 to 10 carbon atoms, so as to obtain the butadiene-acrylonitrile alternating copolymer in which butadiene and acrylonitrile units are alternately combined whereby the mole radio of the total of butadiene units to that of acrylonitrile units is always 1 to 1.

Among the benzenic aromatic hydrocarbons and halides thereof as referred to in Item (1) as the photosensitizer, there are ortho-xylene, meta-xylene, para-xylene, durene, ethylbenzene, chlorobenzene, ortho-dichlorobenzene, bromobenzene, para-dibromobenzene, biphenyl, diphenylmethane, tetralin etc.

Among the polynuclear aromatic compounds and halides thereof as referred to in Item (2) as the photosensitizer are; naphthalene, α-methylnaphthalene, β-methylnaphthalene, chloronaphthalene, bromonaphthalene, phenanthrene, triphenylene, pyrene, perylene, anthracene, 9. 10-dibromoanthracene, fluorene, anthraquinone, xanthone, etc.

As for the heterocyclic compounds and the azoic or aminic compounds as referred to in Item (3) to be used for the sensitizer system, the following are exemplarily enumerated; quinoline, 2,4-dimethylquinoline, carbazole, N-ethylcarbazole, N-vinylcarbazole, 2,2'-bipyridine, 1,2-di-(4-pyridyl)-ethylene, ortho-phenanthroline, azobenzene, azobisisobutyronitrile, triphenylamine, etc.

Among the ketonic, glyoxalic and aldehydic compounds as referred to in Item (4) for the sensitizer system are; acetone, acetophenone, benzophenone, cyclohexanone, ethylphenylketone, α-naphthylmethylketone, β-naphthylmethylketone, α-naphthylphenylketone, β-naphthylphenylketone, diacetyl, benzyl, benzaldehyde, 1-naphthaldehyde, 2-naphthaldehyde, etc.

The sensitizer system according to this invention may comprise at least one selected from the group consisting of the compounds of Items (1) to (4), but often some combinations of two or more of the above attain a desirable result. As preferable combinations, the following may be enumerated; tetralin/benzyl, tetralin/anthraquinone, tetralin/carbazole, tetralin/benzophenone, tetralin/triphenylamine, tetralin/phenanthrene, tetralin/naphthaldehyde, tetralin/anthracene, tetralin/ethylphenylketone, tetralin/fluorene, tetralin/pyrene, tetralin/naphthalene, etc.

The light to be used for carrying out the photopolymerization according to the invention is generally of the wave length of 2,000 to 6,000 Angstrom, and more preferably ultra violet light of 2,000 to 4,000 Angstrom is utilized. As for the light source there is no particular limitation, and for instance a mercury lamp, sodium lamp, xenon lamp or natural sunlight is used through a suitable filter. No particular limitation is taken into consideration as to the method for radiating light to the polymerization reactants. The photopolymerization can be carried out with or without agitation.

The method for charging the monomers to be copolymerized is also optional. The ratio of the two monomers to be charged often slightly affects the yield, polymerization degree, physical properties of the product and the like. Accordingly the ratio would be determined depending on the purpose or use. The mole ratio of butadiene to acrylonitrile lies generally in the range of 20/1 to 1/20, and more preferably of 8/1 to 1/8.

The amount of the sensitizer system may be varied depending on the use of the product, and is in general sufficient with the range of $1/10^{10}$ to 1/4 mole relative to 1 mole of the total monomers as charged. Some of the compounds of (1) and (2) may be used also as solvent for the polymerization reactants, if they are liquid.

The order of addition of the monomers to the sensitizer system is optional, but generally it is preferable to first add the sensitizer to the acrylonitrile, then stir the mixture for a while, followed by addition of butadiene thereto.

The polymerization temperature can be selected in the range of $-100°$ to $100°C$, but generally the range of $-80°$ to $80°$, and more particularly $-30°$ to $40°C$ is preferable. The pressure for polymerization may range from the level to be generally determined by the vapor pressure of the polymerization reactants to around 150 atm., but there is no particular limit also in this respect. The reaction is carried out in such an atmosphere as will not prevent the copolymerization, for instance in the monomer vapor or nitrogen gas.

The reaction can be carried out according to the so-called bulk polymerization in liquid monomers without using any solvent, and more particularly in the reactants in which acrylonitrile comprises the major portion. Of course an ordinary inert solvent not preventing the copolymerization reaction or some of the compounds of (1) and (2) referred to above which are liquid at the polymerization temperature can be used as solvent. As for the inert solvent there can be enumerated aliphatic hydrocarbons, alicyclic compounds, aromatic hydrocarbons except those belonging to the sensitizer (1) and (2) in liquid state at the polymerization temperature. For instance propane, butane, pentane, hexane, cyclohexane, benzene, dichloromethane, chloroform, tetrachloromethane, tetrachloroethane and mixtures thereof are used.

After completion of the copolymerization, the conventional after-treatments are carried out and the resulting copolymer is purified. For that purpose any of the so-called alcohol treatment, alcohol/hydrochloric acid treatment, aqueous hydrochloric acid treatment and the like is applied. For instance after adding N-phenyl-β-naphthylamine as antioxidant, the copolymer solution is mixed into a large amount of methanol/hydrochloric acid or dropped into boiling water to evaporate the unreacted monomers, solvents and the other substances if any, for separating the copolymer which is then subjected to drying in vacuo at 50°C.

The invention shall be more definitely and minutely explained in the following examples which are given merely for the purpose of explanation but not for restricting the invention to these cases.

EXAMPLE 1

A 100 ml flask of 4 mm thickness pyrex glass, the inside of which was sufficiently dried and the air in which was replaced with nitrogen gas, was charged with distilled and purified 326.9 m mole acrylonitrile, and after addition of 10 ml tetralin thereto further charged with 99.9 m mole liquid butadiene having been subjected to cooling-purifying treatment by means of dry-ice/acetone cooling agent, and then sealed. For the photoradiation, the said flask filled with the reactants was placed at a distance of 15 cm from a high pressure mercury lamp, UM-1207B (1200 W) by Ushio Electric Co., Ltd. in Tokyo which was equipped with a water cooling jacket, to carry out the copolymerization while rotating said flask at a temperature of 39°C. After 20 hours photoradiation, the flask was opened remove the contents which were added to about 250 ml methanol containing about 1 wt. % N-phenyl-$\beta$-naphthylamine as antioxidant for separating the precipitated copolymer product. After drying in vacuo a rubber-like elastomer was obtained in a yield of 36.2 % which was calculated with respect to the theoretical value on the assumption of obtaining the perfectly alternating copolymer. The alternating structure was confirmed by means of elemental analysis, nuclear magnetic resonance absorption spectrum and infrared absorption spectrum. No gel content was observed as a result of investigation of the solubility in chloroform.

The photopolymerization under the same conditions but without adding tetralin as the photosensitizer showed a yield of 19.1 %.

EXAMPLE 2

In the same manner as in Example 1, to a solution of 326.9 m mole and 10 ml tetralin was added a solution of 10 m mole carbazole in 0.1 mole/1 acrylonitrile. After addition of 99.9 m mole butadiene thereto, the photopolymerization was carried out for 20 hours to obtain a rubber-like elastomer without gel content in a yield of 38.6%.

EXAMPLE 3

In the same manner as in Example 1, to a solution of 326.9 m mole acrylonitrile and 10 ml tetralin was added a solution of 10 m mole benzophenone in 0.1 mole/1 tetralin. After addition of 99.9 m mole butadiene thereto, the photopolymerization for 20 hours was carried out to obtain a rubber-like elastomer without gel content in a yield of 48.5 %.

EXAMPLE 4

Similarly to Example 3 but using triphenylamine in lieu of benzophenone, a rubber-like elastomer was obtained in a yield of 82.1 %.

EXAMPLE 5

The photopolymerization using anthraquinone in lieu of benzophenone in Example 3 resulted in a rubber-like elastomer in a yield of 77.0 %. The elemental analysis showed that the acrylonitrile unit in the resulting copolymer was 51.40 mole %. The nuclear magnetic resonance absorption spectrum and infrared absorption spectrum showed the resulting copolymer to be of alternating structure.

EXAMPLE 6

Similarly to Example 3 but using phenanthrene in lieu of benzophenone, a rubber-like elastomer without gel content was obtained in a yield of 46.8 %.

EXAMPLE 7

A rubber-like elastomer was obtained in a yield of 98.6 % using benzyl in lieu of benzophenone in Example 3. The limiting viscosity number in dimethylformamide at 30°C was 0.75. As a result of the elemental analysis it was found that the acrylonitrile unit was 52.34 mole % in the resulting copolymer. Further the alternating structure of the copolymer was confirmed by means of the nuclear magnetic resonance absorption spectrum and infrared absorption spectrum.

EXAMPLE 8

Similar to Example 3 but using 1-naphthaldehyde in lieu of benzophenone, a rubber-like elastomer without gel content was obtained in a yield of 49.1 %.

EXAMPLE 9

A rubber-like elastomer without gel content was obtained in a yield of 38.1 % using anthracene in lieu of benzophenone in Example 3.

EXAMPLE 10

A rubber-like elastomer without gel content was obtained in a yield of 48.6 % using 2-naphthaldehyde in lieu of benzophenone in Example 3.

EXAMPLE 11

A rubber-like elastomer without gel content was obtained in a yield of 39.9 % using ethylphenylketone in lieu of benzophenone in Example 3.

EXAMPLE 12

A rubber-like elastomer without gel content was obtained in a yield of 58.7 % using fluorene in lieu of benzophenone in Example 3. The limiting viscosity number in dimethylformamide at 30°C was 0.78. According to the elemental analysis it was found that the acrylonitrile unit occupied 49.31 mole % in the resulting copolymer.

EXAMPLE 13

A rubber-like elastomer without gel content was obtained in a yield of 49.2 % using naphthalene in lieu of benzophenone in Example 3.

What is claimed:

1. A process for manufacturing butadiene acrylonitrile alternating copolymer in which butadiene and acrylonitrile units are alternately combined so that the mole ratio of the total acrylonitrile units to the total butadiene units is always 1 to 1, as the sole polymerization promoter selected from the group consisting of adding a photosensitizer comprising at least one compound selected from the group consisting of ortho-xylene, meta-xylene, para-xylene, durene, ethylbenzene, chlorobenzene, ortho-dichlorobenzene, bromobenzene, para-dibromobenzene, biphenyl, diphenylmethane and 1,2,3,4-tetrahydronaphthalene to reactants of butadiene and acrylonitrile in the mole ratio of 20/1 to 1/20 and irradiating the mixture with light having a wave length ranging from 2,000 to 6,000 Angstrom units at a temperature of −100° to +100° C.

2. A process as claimed in claim 1, in which the mole ratio of butadiene to acrylonitrile ranges from 8/1 to 1/8.

3. A process as claimed in claim 1, in which the polymerization temperature is −80° to 80°C.

4. A process as claimed in claim 1, in which the reaction is carried out in an atmosphere which will not interfere with the copolymerization and under a pressure ranging from the vapor pressure of the polymerization reactants to around 150 atm.

5. A process as claimed in claim 1 wherein the photosensitizer is 1,2,3,4-tetrahydronaphthalene.

6. A process as claimed in claim 1 in which the photosensitizer is present in an amount of $1/10^{10}$ to 1/4 mole per 1 mole of the total butadiene and acrylonitrile present.

7. A process as claimed in claim 4 in which the reaction is carried out in an atmosphere of the monomer vapor or nitrogen.

* * * * *